US011427467B1

(12) United States Patent
Siriwardane et al.

(10) Patent No.: US 11,427,467 B1
(45) Date of Patent: Aug. 30, 2022

(54) IRON BASED CATALYSTS FOR PRODUCTION OF CARBON AND HYDROGEN FROM DECOMPOSITION OF METHANE

(71) Applicant: Energy, United States Department of, Washington, DC (US)

(72) Inventors: Ranjani Siriwardane, Morgantown, WV (US); William Benincosa, Chicago, IL (US); Jarrett Riley, Morgantown, WV (US)

(73) Assignee: Energy, United States Department of, Washington, DC (US)

( * ) Notice: Subject to any disclaimer, the term of this patent is extended or adjusted under 35 U.S.C. 154(b) by 625 days.

(21) Appl. No.: 16/360,916

(22) Filed: Mar. 21, 2019

Related U.S. Application Data

(60) Provisional application No. 62/652,077, filed on Apr. 3, 2018.

(51) Int. Cl.
*C01B 3/26* (2006.01)
*B01J 23/745* (2006.01)
(Continued)

(52) U.S. Cl.
CPC .............. *C01B 3/26* (2013.01); *B01J 23/002* (2013.01); *B01J 23/745* (2013.01); *B01J 37/08* (2013.01);
(Continued)

(58) Field of Classification Search
CPC .............. C01B 3/26; C01B 2203/0277; C01B 2203/049; C01B 2203/1241; B01J 23/002;
(Continued)

(56) References Cited

U.S. PATENT DOCUMENTS 8,092,778 B2   1/2012  Zhu et al.
2008/0164443 A1* 7/2008 White .................. B01J 23/74
                                                  252/373

(Continued)

FOREIGN PATENT DOCUMENTS

WO   WO2014150944   *  9/2014
WO   WO2018189723   * 10/2018

OTHER PUBLICATIONS

Amin et al., International Journal of hydrogen Energy, 36, 2011, 2904-2935.

(Continued)

*Primary Examiner* — Douglas B Call
(74) *Attorney, Agent, or Firm* — Aaron R. Keith; Jacob A. Heafner; Michael J. Dobbs

(57) ABSTRACT

The invention provides a calcined $Fe_x$—$Al_y$—$O_z$ based catalyst for the decomposition of hydrocarbons such as methane to produce hydrogen and carbon. The catalyst comprises iron oxide mixed with aluminum oxide and calcined at temperatures above 1100° C., where $Fe_x$—$Al_y$—$O_z$ is a chemical composition with x>0.1, y>0.1, z≥0 and 0<x/y<200. Reaction of the calcined $Fe_x$—$Al_y$—$O_z$ catalyst with methane generates a product stream comprising at least 40 vol. % $H_2$ and carbon. In an embodiment, carbon is separated from the catalyst and the catalyst is reused for continuous methane decomposition to produce $H_2$.

15 Claims, 9 Drawing Sheets

(A)

(B)

(51) Int. Cl.
  *B01J 37/08*   (2006.01)
  *B01J 23/00*   (2006.01)
(52) U.S. Cl.
  CPC ...... *B01J 2523/31* (2013.01); *B01J 2523/842* (2013.01); *C01B 2203/0277* (2013.01); *C01B 2203/049* (2013.01); *C01B 2203/1241* (2013.01)
(58) Field of Classification Search
  CPC ...... B01J 23/745; B01J 37/08; B01J 2523/31; B01J 2523/842
  USPC ........................................................ 423/651
  See application file for complete search history.

(56) References Cited

U.S. PATENT DOCUMENTS

| | | | | |
|---|---|---|---|---|
| 2012/0079814 | A1* | 4/2012 | Blomquist | F01N 13/011 60/278 |
| 2012/0114550 | A1 | 5/2012 | Bahattab et al. | |
| 2013/0180258 | A1* | 7/2013 | Robels Macias | C12P 7/52 60/772 |
| 2016/0016794 | A1* | 1/2016 | Noyes | C01B 3/38 423/652 |
| 2016/0129423 | A1* | 5/2016 | Basset | C07C 2/76 423/651 |
| 2021/0114003 | A1* | 4/2021 | Basset | B01J 38/10 |

OTHER PUBLICATIONS

Tang et al., Catalysis Communications, 11, 2010, 1215-1219, Methane decomposition over ceria modified iron catalysts.
Zhou et al., Applied Catalysis B: Environmental, 208, 2017, 44-59, Fe catalysts for methane decomposition to produce hydrogen and carbon nano materials.
Torres et al., Journal of Natural Gas Chemistry, 21, 2012, 367-373, Hydrogen production by catalytic decomposition of methane using a Fe-based catalyst in a fluidized bed reactor.
Kutter et al., Catal. Sci. Technol., 2018,8, 858, Methane decomposition to tip and base grown carbon nanotubes and COx-free H2 over mono and bimetallic 3d transition metal catalysts.
Li et al., Journal of Molecular Catalysis A: Chemical, 221, 2004, 105-112, Active Nb2O5-supported nickel and nickel-copper catalysts for methane decomposition to hydrogen and filamentous carbon.
Wang et al., International Journal of hydrogen Energy, 44, 2019, 7205, Effect of metal additives on the catalytic performance of Ni/Al2O3 catalyst in thermocatalytic decomposition of methane.
Li et al. Fusion Engineering, 2017, Evolution of the Ni—Cu—SiO2catalyst for methane decomposition to prepare hydrogen.
Pinilla et al., International Journal of Hydrogen Energy, 32, 2007, 4821-4829, Production of hydrogen and carbon nanofibers by thermal decomposition of methane using metal catalysts in a fluidized bed reactor.
Resetenko et al., Applied Catalysis A: General, 247, 2003, 51-63, Carbon capacious Ni—Cu—Al2O3 catalysts for high-temperature methane decomposition.
Ermakova et al., Decomposition of Methane over Iron Catalysts at the Range of Moderate Temperatures: The Influence of Structure of the Catalytic Systems and the Reaction Conditions on the Yield of Carbon and Morphology of Carbon Filaments; Journal of Catalysis 201, 183-197 (2001).
Kong et al., Chemical vapor deposition of methane for single-walled carbon nanotubes; Chemical Physics Letters 292, 1998, 567-574.
Zhou et al., Chemical vapor deposition of methane for single-walled carbon nanotubes; Chemical Physics Letters 292 □1998. 567-574.

* cited by examiner

IRON BASED CATALYSTS FOR PRODUCTION OF CARBON AND HYDROGEN FROM DECOMPOSITION OF METHANE

CROSS REFERENCE TO RELATED APPLICATIONS

This application claims the benefit of U.S. Provisional Application No. 62/652,077 filed on Apr. 3, 2018. The disclosure of the full application is incorporated herein by reference.

GOVERNMENT INTEREST

The United States Government has rights in this invention pursuant to the employer-employee relationship of the Government to the inventors as U.S. Department of Energy employees and site-support contractors at the National Energy Technology Laboratory.

FIELD OF THE INVENTION

One or more embodiments relate to conversion of hydrocarbons such as methane containing gas streams to carbon and hydrogen using iron oxide and alumina. More specifically, one or more embodiments relate to development of iron oxide and alumina catalysts calcined above 1150° C. for conversion of hydrocarbons such as methane to carbon and hydrogen by direct decomposition process.

BACKGROUND OF THE INVENTION

Production of hydrogen from natural gas has received much attention because it is a promising energy source that is also environmentally benign. Hydrogen is used in oil refineries for ammonia synthesis, methanol production, and fuel cells. Current commercial hydrogen production methods from methane are based on steam methane reforming, coal or bio-mass gasification, electrolysis, and thermochemical process. Energy efficiency and hydrogen price data (International Journal of Hydrogen Energy 35 (2010) 1160-1190 by Abbas et al.) indicate that the methane steam reforming, methane partial oxidation and coal gasification are the most cost-effective techniques for hydrogen production. In all these processes the first product is synthesis gas and then a water gas shift reactor is used for conversion of syngas to $H_2$ and $CO_2$. To purify $H_2$, pressure swing adsorption is used for separation of $H_2$ from $CO_2$. It is necessary to develop direct $H_2$ production processes from methane to avoid additional steps involved via the syngas route. Catalytic methane decomposition is a method that produces $H_2$ and carbon from decomposition of methane (equation 1) and this process does not require additional processing steps for $H_2$ production. A technoeconomic analysis (See Steinberg and Cheng, Int. J. Hydrogen Energy, Vol. 14, No. 11, pp 797-820, 1989) indicated that methane decomposition process is more economical than other $H_2$ production processes.

$$CH_4 \rightarrow C + H_2 \quad [1]$$

The methane decomposition process also produces the byproduct carbon which is valuable. Elemental carbon (C) has application in numerous industries including automotive, aerospace, electronics, construction, and defense. It can also be produced in several commercially-useful forms such as carbon black (CB), carbon nanotubes (CNTs) and the closely-related, carbon nanofibers (CNFs). Carbon black is produced via incomplete combustion of gaseous or liquid hydrocarbons under specific reaction conditions. Such production processes, however, generate a substantial amount of pollutant emissions, particularly carbon dioxide ($CO_2$), sulfur dioxide ($SO_2$), and nitrogen oxide ($NO_x$). The Environmental Protection Agency has targeted the CB industry to reduce $SO_2$ emissions by 95% and $NO_x$ emissions by 90%. As regulations for reducing emissions continue to become stricter, industry will need to invest significant capital in cleaner, more efficient methods of carbon production.

Conventional thermal decomposition of methane (TDM) methods often employ environmentally-hazardous catalysts such as nickel. Other catalysts containing supported iron and mixed metal oxides such as Fe—Cu have been used. However, these catalysts failed to produce long term stability, high conversions of methane and necessary physical strength during long term tests. In addition, carbon was attached to the metal particles making it inherently difficult to separate carbon from the metal catalysts hindering the feasibility of a continuous process. The preparation method of these catalysts reported previously involved calcination of the catalysts below 600° C. A catalyst consists of carbon and iron based material not calcined in air has been reported for microwave reactor use (see Zhu et al. U.S. Pat. No. 8,092,778 B2 Jan. 10, 2012, "Method for producing a hydrogen enriched fuel and carbon nano tubes using microwave assisted methane decomposition on catalysts"). An Fe based catalyst calcined below 400° C. for chemical vapor deposition (CVD) process to produce carbon from methane is also reported (see U.S. Patent application, "Novel combination catalysts based on iron for the synthesis of carbon nano tubes by chemical vapor deposition" Bahattab et al. Pub No. US 2012/0114550 A1). Other reported iron based catalysts were calcined below 600° C., and failed to achieve long term stability (see Kong et al., Chemical Physics Letters 292, 1998, 567-574, see Zhou et al, Applied Catalysis B: Environmental 208 (2017) 44-59). The catalytic activity of Fe oxide catalysts (dried at room temperature but not calcined in air) decreased when the $H_2$ reduction was conducted above 800° C. prior to a methane reaction (See Ermarkova et al Journal of Catalysis 201, 183-197 (2001)). These conventional catalyst preparation methods used low air calcination temperatures to retain surface area which is desirable for good catalytic activity.

A novel method to prepare catalysts for methane decomposition to produce $H_2$ and carbon is described in this invention disclosure. The catalysts comprise iron and alumina precursors prepared by wet agglomeration method. These catalysts were calcined in air at temperatures above 1150° C. to form a catalyst with high methane conversion, high physical strength, and chemical/physical stability over long operation periods. Catalyst preparation procedure and long-term stability tests are described in this invention disclosure.

SUMMARY OF THE INVENTION

The disclosure provides an iron-alumina based catalyst having improved durability and reactivity over metal oxide based catalysts currently used in the decomposition of hydrocarbons such as methane to produce hydrogen and carbon. The iron-alumina based catalysts comprise $Fe_x$—$Al_y$—$O_z$ calcined in air at temperatures above 1150° C. to form the calcined $Fe_x$—$Al_y$—$O_z$ catalyst. The calcined $Fe_x$—$Al_y$—$O_z$ catalyst has an Fe—Al solid solution phase where $Fe_x$—$Al_y$—$O_z$ has a chemical molar composition with $x>0.1$, $y>0.1$, $z\geq0$ and $0<x/y<200$. For example, $Fe_x$—$Al_y$—$O_z$ may be one of $Fe_{2.5}$—$Al_{0.5}$—$O_z$, $Fe$—$Al_2$—$O_z$ or $Fe_{0.5}$—$Al_{2.5}$—$O_z$.

The calcined $Fe_x$—$Al_y$—$O_z$ catalyst may be utilized for the decomposition of $C_1$ to $C_4$ hydrocarbons such as methane by supplying the calcined $Fe_x$—$Al_y$—$O_z$ catalyst to a catalytic reactor and delivering the methane to the $Fe_x$—$Al_y$—$O_z$ catalyst, at a reducing temperature preferably above 550° C., such that some portion of methane is decomposed to carbon and hydrogen. Within the catalytic reactor, the calcined $Fe_x$—$Al_y$—$O_z$ catalyst interacts with methane, causing decomposition of the methane to generate a solid product stream of solid carbon on the catalyst and a gaseous product stream of at least 40 vol % hydrogen.

In one embodiment, the calcined $Fe_x$—$Al_y$—$O_z$ catalyst is reduced using a reducing gas at temperatures above 500° C. to obtain reduced forms of the calcined $Fe_x$—$Al_y$—$O_z$ catalyst prior to the methane introduction. The reducing gas for initial reduction of $Fe_x$—$Al_y$—$O_z$ catalyst may be selected from $H_2$, CO, or synthesis gas. After the initial reduction of the calcined $Fe_x$—$Al_y$—$O_z$ catalyst, a gas stream containing methane is introduced (delivered) to the calcined $Fe_x$—$Al_y$—$O_z$ catalyst for methane decomposition.

In one embodiment, solid carbon accumulated in the calcined $Fe_x$—$Al_y$—$O_z$ catalyst as the solid product stream is withdrawn by various methods. Exemplary methods that include sieving, elutriation where a gas stream at an appropriate flow velocity separates the carbon from the calcined $Fe_x$—$Al_y$—$O_z$ catalyst or utilizing a liquid separation method. The catalyst after carbon removal is re-used (recycled) for a continuous methane decomposition reaction.

In another embodiment, the carbon accumulated on the catalyst may be removed via introduction of gases that react with carbon. Such gases include steam to produce synthesis gas, $CO_2$ to produce CO, and Oxygen to produce $CO_2$. The catalyst after regeneration by removal of the carbon is re-used for reaction with methane.

The calcined $Fe_x$—$Al_y$—$O_z$ catalyst disclosed is further demonstrated and described in the following description.

DETAILED DESCRIPTION OF THE INVENTION

Figure 1:
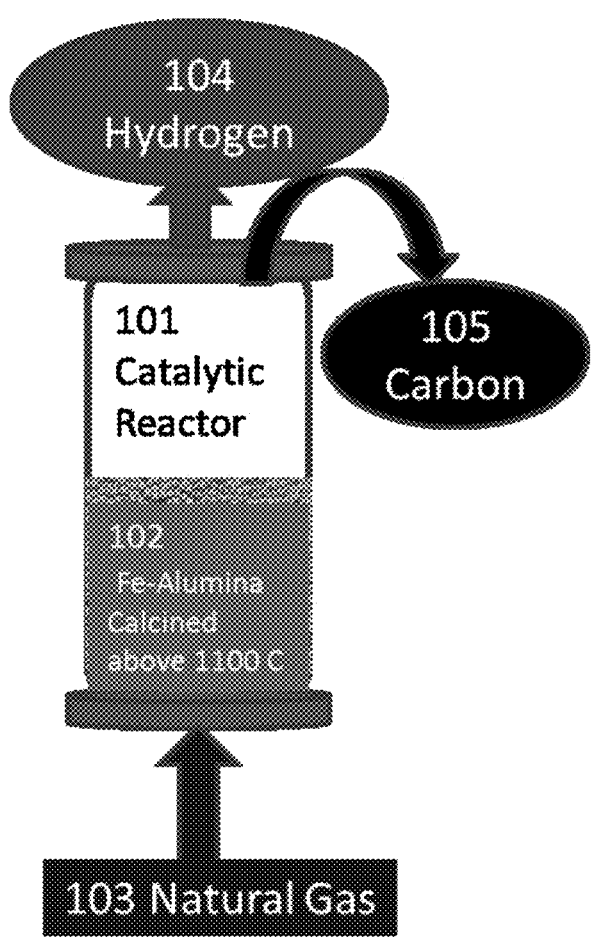
FIG. 1: depicts the process of production of $H_2$ and carbon from methane using the calcined $Fe_{2.5}$—$Al_{0.5}$—$O_z$ catalyst.

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide description of inorganic materials, methods of their preparation, and methods for using such materials. The invention provides catalysts using iron oxide and alumina oxide and a method for preparation thereof for production of $H_2$ and carbon from hydrocarbons such as methane.

$Fe_x$—$Al_y$—$O_z$ catalysts calcined above 1150° C. have unique properties. The calcined $Fe_x$—$Al_y$—$O_z$ catalysts react with $C_1$ to $C_4$ hydrocarbons such as methane to produce carbon and $H_2$. Other preferred hydrocarbons include ethane, propane, butane, and ethylene. The resulting carbon is not strongly attached to the metal, thus making carbon separation from the catalyst relatively easy. Therefore, the calcined $Fe_x$—$Al_y$—$O_z$ catalyst are available to be reused (recycled) after carbon separation because the catalyst has not been deactivated from carbon agglomeration. The calcined $Fe_x$—$Al_y$—$O_z$ catalysts provide almost complete conversion of methane to produce carbon and hydrogen. The disclosed $Fe_x$—$Al_y$—$O_z$ catalyst calcined above 1150° C. have improved durability and reactivity over metal catalysts currently used in the decomposition of methane carbon and hydrogen.

The $Fe_x$—$Al_y$—$O_z$ based catalysts are prepared from iron oxide mixed with aluminum oxide, then calcined at temperatures above 1150° C. The $Fe_x$—$Al_y$—$O_z$ has a chemical composition where $x>0.1$, $y>0.1$, $z\geq0$ and $0<x/y<200$. In particular embodiments, $Fe_x$—$Al_y$—$O_z$ may be one of $Fe_{2.5}$—$Al_{0.5}$—$O_z$, $Fe$—$Al_2$—$O_z$ or $Fe_{0.5}$—$Al_{2.5}$—$O_z$. The calcined $Fe_x$—$Al_y$—$O_z$ catalyst may be utilized for the decomposition of methane by delivering the $Fe_x$—$Al_y$—$O_z$ catalyst to a catalytic reactor and introducing methane to the $Fe_x$—$Al_y$—$O_z$ catalyst, preferably at a temperature above 550° C., such that some portion of methane is decomposed to carbon and hydrogen. Within the catalytic reactor, the calcined $Fe_x$—$Al_y$—$O_z$ catalyst interacts with methane and generates a solid product stream comprising carbon on the catalyst and a gaseous stream of hydrogen comprising at least 40 vol. % the product gas streams. The carbon of the solid product stream and the gaseous product stream are then available for removal (withdrawing) from the catalytic reactor. In one embodiment, the calcined $Fe_x$—$Al_y$—$O_z$ catalyst is reduced using a reducing gas stream at temperatures above 500° C. to obtain reduced forms of $Fe_x$—$Al_y$—$O_z$ catalyst prior to the delivering the hydrocarbon gaseous stream. The reducing gas for initial reduction of $Fe_x$—$Al_y$—$O_z$ catalyst may be selected from $H_2$, CO, or synthesis gas. After the initial reduction of the calcined $Fe_x$—$Al_y$—$O_z$ catalyst, a gaseous stream containing the $C_1$ to $C_4$ hydrocarbons is delivered to the $Fe_x$—$Al_y$—$O_z$ catalyst via introduction to the catalytic reactor for hydrocarbon decomposition.

Once decomposition of the hydrocarbon by the calcined $Fe_x$—$Al_y$—$O_z$ catalyst occurs, the gaseous product stream comprising $H_2$ and the carbon of the solid product stream are withdrawn from the catalytic reactor. Withdrawing of the gaseous product stream may be performed as a product stream at an exhaust outlet of the catalytic reactor. Likewise, the carbon product is withdrawn from the catalytic reactor. The solid carbon forms in contact with the calcined $Fe_x$—$Al_y$—$O_z$ catalyst to comprise the solid product stream. The entirety of the solid product stream may be withdrawn, or the carbon may be separated from the catalyst and the carbon withdrawn while leaving catalyst in the catalytic reactor. In one embodiment, carbon accumulated within the calcined $Fe_x$—$Al_y$—$O_z$ catalyst is separated from the solid product stream by sieving, elutriation, or utilizing a liquid separation method. The catalyst after carbon removal is then available for recycling (re-use) for a continued methane decomposition reaction.

In another embodiment the carbon accumulated on the catalyst may be removed via introduction of gases that react with carbon. Such gases include steam to produce synthesis gas, $CO_2$ to produce CO and Oxygen to produce $CO_2$. The catalyst after regeneration is re-used for reaction with methane.

A system 100 within which the calcined $Fe_x$—$Al_y$—$O_z$ catalyst disclosed here may be utilized is illustrated at FIG. 1. FIG. 1 illustrates decomposition of methane system includes a catalytic reactor 101. Calcined $Fe_x$—$Al_y$—$O_z$ catalyst 102 is supplied in the catalytic reactor 101. Natural gas (Methane) 103 is delivered to the catalytic reactor 101 for the methane decomposition reaction with calcined $Fe_x$—$Al_y$—$O_z$ catalyst. The catalytic reactor 101 is maintained at a reducing temperature sufficient to decompose at least a portion of methane 103. In an embodiment, the reducing temperature is from about 550° C. to about 1100° C. The reaction [1] involved in the catalytic reactor 101 for decomposition of methane 103 in the presence of the catalyst 102 produces a gaseous product stream containing $H_2$ 104 and solid carbon 105 on the $Fe_x$—$Al_y$—$O_z$ catalyst 102. The $H_2$ product 104 is withdrawn from the catalytic reactor 101 as a gaseous product stream at exhaust, and the carbon product 105 is separated from the calcined $Fe_x$—$Al_y$—$O_z$ catalyst 102 and withdrawn (removed) from the catalytic reactor. At the exhaust, at least 40 vol. % of the product stream comprises $H_2$. In an embodiment, at least 90 vol. % of the product stream comprises $H_2$. The catalyst 102 after carbon separation is recycled in the catalytic reactor 101 for continuous production of hydrogen 104 and solid carbon 105.

It is understood that FIG. 1 provides an exemplary application illustrating decomposition or cracking of methane, and the like, however the specifics of the process illustrated are not intended to be limiting. Within this disclosure, it is only necessary that the catalyst be supplied to the catalytic reactor, where the catalyst comprises calcined $Fe_x$—$Al_y$—$O_z$ catalyst where x>0.1, y>0.1, z≥0 and 0<x/y<200, and that the catalyst contacts a $C_1$ to $C_4$ hydrocarbon containing gaseous stream delivered to the catalytic reactor, maintaining the catalytic reactor at a temperature sufficient decompose some portion of methane to generate a gaseous product stream comprising at least 40 vol. % $H_2$ and a solid product stream comprising solid carbon, withdrawing at least a portion of the gaseous product stream, and withdrawing at least a portion of the carbon. In an embodiment, $Fe_x$—$Al_y$—$O_z$ is one of $Fe_{2.5}$—$Al_{0.5}$—$O_z$, Fe—$Al_2$—$O_z$ or $Fe_{0.5}$—$Al_{2.5}$—$O_z$, or combinations thereof.

Figure 2:
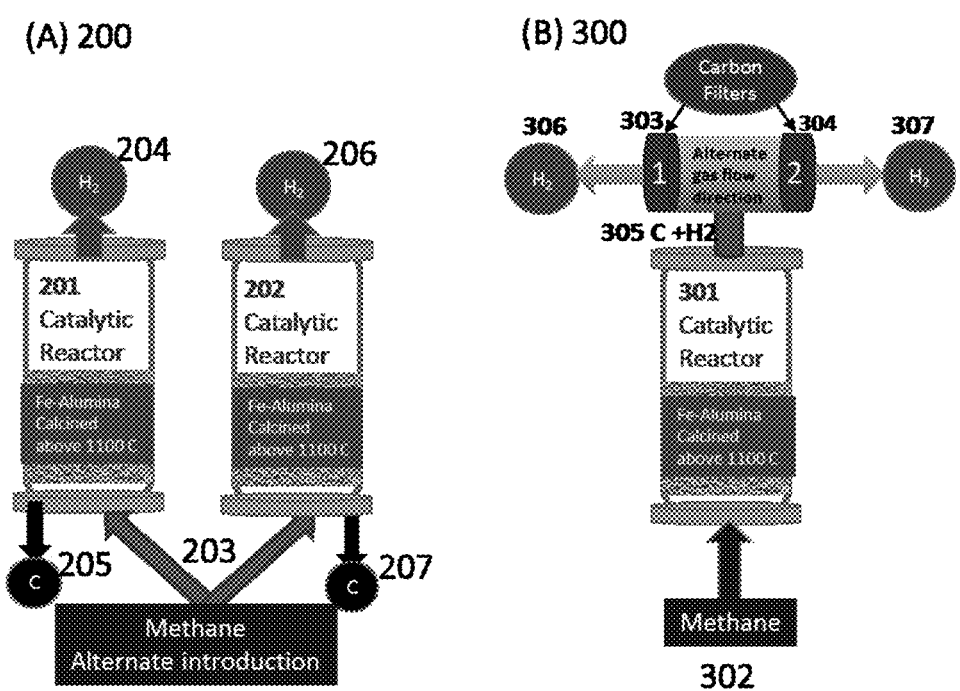
FIG. 2: depicts reactor configurations for continuous operation (A) alternating inlet methane gas stream with multiple reactors (B) alternating effluent gas stream with multiple carbon filters.

Another system 200 is illustrated at FIG. 2A within which the calcined $Fe_x$—$Al_y$—$O_z$ catalyst is utilized for a continuous production of $H_2$ and carbon from $C_1$ to $C_4$ hydrocarbons. FIG. 2A illustrates decomposition of $C_1$ to $C_4$ (methane) hydrocarbon system includes two or more catalytic reactors, a first catalytic reactor 201 and a second catalytic reactor 202 containing calcined $Fe_x$—$Al_y$—$O_z$ catalyst. Methane 203 is delivered to the catalytic reactor 201 for the methane decomposition reaction. The catalytic reactor is maintained at a reducing temperature from about 550° C. to about 1100° C. to facilitate the decomposition of methane to a gaseous product stream comprising $H_2$ and a solid product stream comprising carbon. The $H_2$ product 204 are withdrawn from catalytic reactor 201 as a gaseous product stream at the exhaust. When the reactor 201 is saturated with carbon product as indicated by the decrease in $H_2$ 204 concentration combined with the increase in pressure in the reactor 201, methane 203 is directed to the catalytic reactor 202 containing calcined $Fe_x$—$Al_y$—$O_z$ catalyst. The carbon product 205 is separated from the calcined $Fe_x$—$Al_y$—$O_z$ catalyst in catalytic reactor 201. When the reactor 202 is saturated with carbon product as indicated by the decrease in $H_2$ 206 concentration combined with increase in pressure in the reactor 202, methane 203 is re-directed to the catalytic reactor 201 containing calcined $Fe_x$—$Al_y$—$O_z$ catalyst. By alternating the methane gas stream 203, a continuous production process of $H_2$ and carbon is obtained.

Another system 300 is illustrated at FIG. 2B within which the calcined $Fe_x$—$Al_y$—$O_z$ catalyst is utilized for a continuous production of $H_2$ and carbon from $C_1$ to $C_4$ hydrocarbons. FIG. 2B illustrates decomposition of methane system includes a catalytic reactor 301 supplied with calcined $Fe_x$—$Al_y$—$O_z$ catalyst. Methane 302 is delivered to the catalytic reactor 301 for the decomposition reaction. The catalytic reactor is maintained at a reducing temperature from about 550° C. to about 1100° C. to facilitate the decomposition of methane to a gaseous product stream comprising $H_2$ and a solid product stream comprising carbon. The methane 302 gas flow rate is sufficient to elutriate carbon deposited within the catalyst reactor bed. The gaseous product stream 305 containing $H_2$ and elutriated particles containing carbon is directed to the carbon filter 303. $H_2$ 306 is withdrawn from catalytic reactor 301 as a gaseous product stream at the exhaust from the carbon filter 303. When the carbon filter 303 gets saturated with carbon as indicated by the pressure increase in reactor 301, the gaseous product stream 305 containing $H_2$ and elutriated carbon is directed to the carbon filter 304. Carbon is then withdrawn from the catalytic reactor 301 by cleaning or removing and replacing the filter 303. $H_2$ 307 is withdrawn from catalytic reactor 301 as a gaseous product stream at exhaust from the carbon filter 304. Carbon is then withdrawn from the catalytic reactor 301 by cleaning or removing and replacing the filter 304. The direction of the product stream 305 containing $H_2$ and carbon is alternated between carbon filters to get a continuous process of production of carbon and $H_2$.

Catalyst Preparation.

Catalysts were prepared using $Fe_2O_3$ and $Al_2O_3$ powders. Stoichiometric amounts the metal oxide powder precursors with appropriate molar ratios of Fe and Al to form $Fe_{2.5}$—$Al_{0.5}$—$O_z$, Fe—$Al_2$—$O_z$ or $Fe_{0.5}$—$Al_{2.5}$—$O_z$. Catalysts were evenly mixed in a cylindrical rotary mixer. Deionized water was added dropwise while mixing until pellets in the desired size range were obtained. These pellets were heated to calcination in a furnace at 2° C./min to 1200° C. and kept isothermally for six hours.

Initial performance evaluation of the catalysts was conducted by thermogravimetric analysis (TGA). Temperature programmed reductions (TPR) were conducted in the thermogravimetric analysis (System Q 600 SDT from TA instruments). The $Fe_x$—$Al_y$—$O_z$ catalyst calcined at 1200° C. was first reduced in $H_2$ in a TGA unit at 850° C. The TPR was conducted with the reduced catalyst by delivering 20 vol. % methane at ambient temperature and ramping the temperature in methane at 20° C./min from ambient to 900° C. The data were used for evaluation of reaction initiation temperature and amount of carbon deposition.

Long term multi step evaluation of $H_2$ and carbon production from methane with calcined $Fe_x$—$Al_y$—$O_z$ catalysts was conducted in a fixed bed flow reactor. The bench-scale fixed-bed flow reactor (inner diameter 11.4 mm) tests were conducted with 4.5 ml of catalyst. The catalyst (180-600 microns) supplied to the reactor was reduced with 20% $H_2$ at 800° C. in He until 20% $H_2$ breakthrough and was cooled to the reaction temperature in He prior to the methane introduction. Methane (15-20%) in He was introduced at the reaction temperature at ambient pressure. When the reactor pressure increased to 70 psi due to carbon build-up, the methane introduction was stopped and the reactor was cooled to ambient temperature in He. The solids remaining in the reactor were sieved using a rotar tap sieving device to separate the particles below 75 The particles above 75µ were placed in the reactor and the methane decomposition reaction was continued at the reaction temperature. The concentrations of the outlet gases ($CO_2$, $H_2$, $CH_4$, and CO) from the reactor were measured using a Mass Spectrometer (Pfeiffer Omnistar).

Characterization of carbon produced during the fixed bed reactor tests was conducted using Raman Spectroscopy. A Horiba Jobin Yvon-LabRAM HR Evolution spectrometer equipped with a confocal microscope was used for Raman spectroscopic analysis. Ar-ion laser with wavelength 532 nm was used at a spectral resolution at 0.65 cm−1. X-ray diffraction analysis (XRD) analyses were carried out using a Panalytical PW 3040 X-Pert Pro XRD system equipped with a 60 kv PW 3373/00 Cu LFF high power ceramic tube with a Cu anode and a PW 3011/20 detector. Scanning electron microanalysis was conducted with a JEOL 7600 FESEM system interfaced to a Thermo-Electron System 7 microanalysis system. The Thermo-electron microanalysis system is equipped with a thermo-electron ultra-dry energy dispersive spectrometer (EDS) and an EDAX electron backscatter diffraction system.

Figure 3:
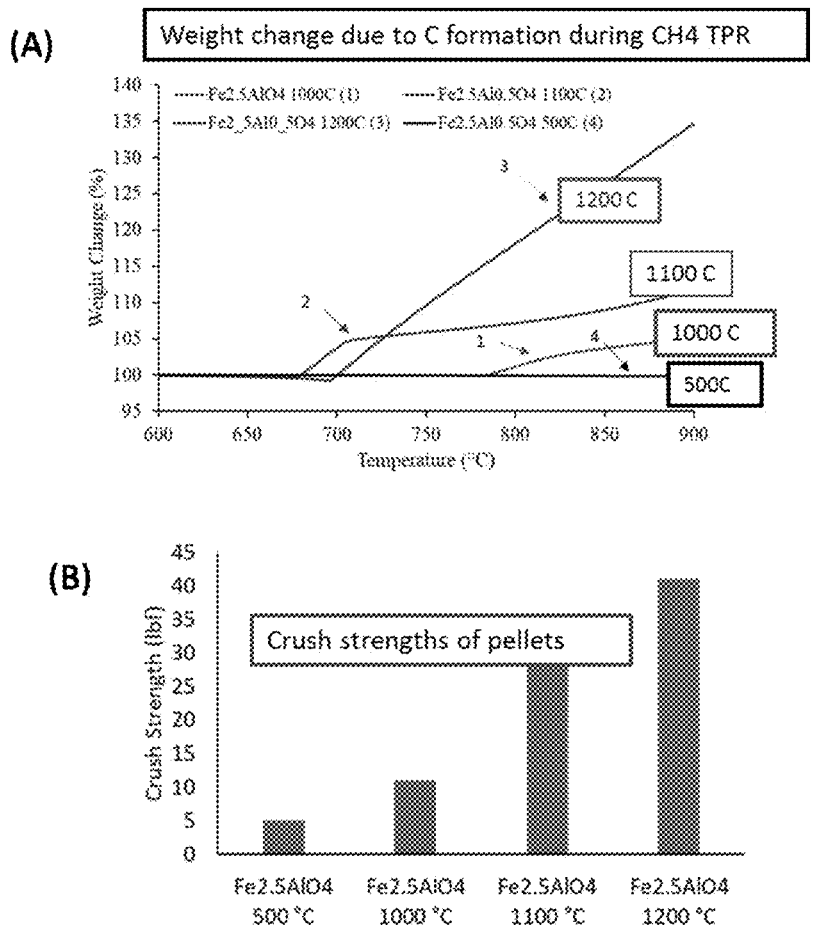
FIG. 3: depicts the Temperature Programmed Reaction (TPR) in methane data with $Fe_{2.5}$—$Al_{0.5}$—$O_z$ calcined at various temperatures (A) and crush strength of pellets calcined at different temperatures (B).

The methane TPR-TGA data demonstrated the methane decomposition process described in FIG. 1 with $Fe_x$—$Al_y$—$O_z$ calcined above 1150° C. Methane TPR data in TGA with the reduced iron oxide-alumina catalyst with the molar composition $Fe_{2.5}$—$Al_{0.5}$—$O_z$ calcined at different temperatures are shown in FIG. 3A. The weight gain which is indicative of carbon formation increased with increasing calcination temperature. The carbon formation was negligible when the material was calcined at 500° C. and it increased with increasing calcination temperature. There was a drastic increase in carbon formation when the calcination temperature was increased from 1100° C. to 1200° C. The data indicated that the carbon formation was highly dependent on the calcination temperature and 1200° C. calcination provided the best performance. The crush strength of the pellets (180-600µ) calcined at different temperatures are shown in FIG. 3B. The crush strength of the pellets calcined at 500° C. had the lowest strength and the crush strength increased with increasing calcination temperature. The highest crush strength was obtained with the sample calcined at 1200° C. Both carbon production and crush strength data indicated that the pellets calcined at 1200° C. have the best performance.

Figure 4:
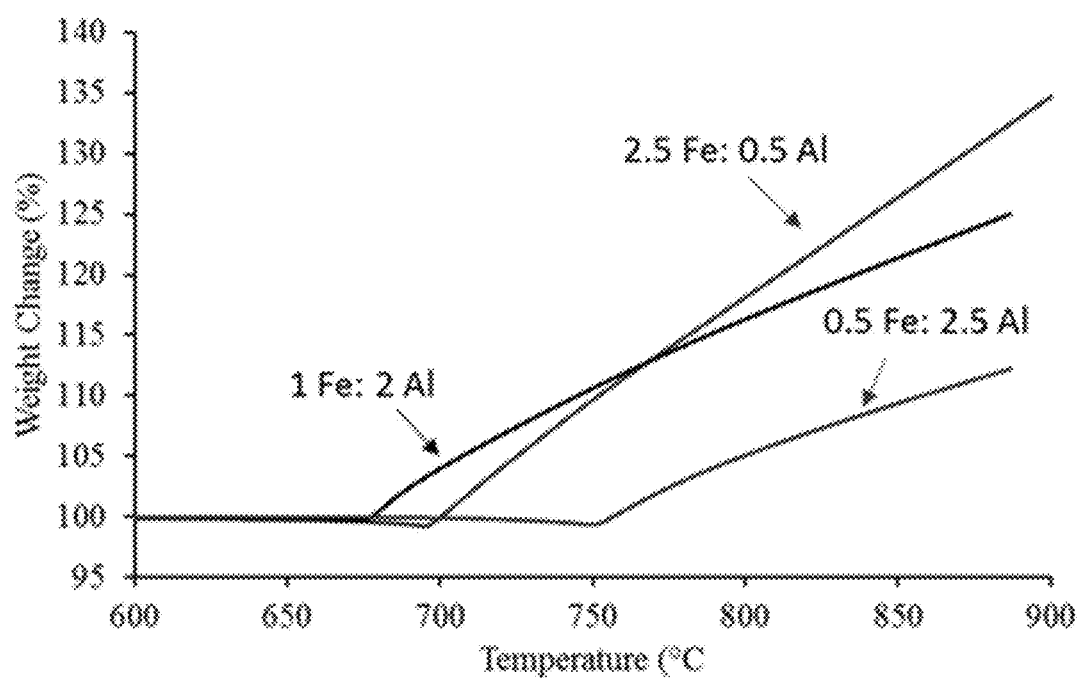
FIG. 4: depicts Temperature Programmed Reaction data with methane with $Fe_x$—$Al_y$—$O_z$ catalyst calcined at 1200° C. with different Fe to Al molar ratios.

The effect of Fe to Al molar ratio on the carbon formation during methane TPR-TGA is shown in FIG. 4. The composition with a higher Fe—Al ratio ($Fe_{2.5}$—$Al_{0.5}$—$O_z$) demonstrated the highest total carbon formation. With the formulation Fe—$Al_2$—$O_z$ (higher Al to Fe ratio) the reaction initiation temperature decreased and the carbon formation also decreased. With the $Fe_{0.5}$—$Al_{2.5}$—$O_z$ formulation both the reaction initiation temperature and the carbon formation decreased.

Figure 5:
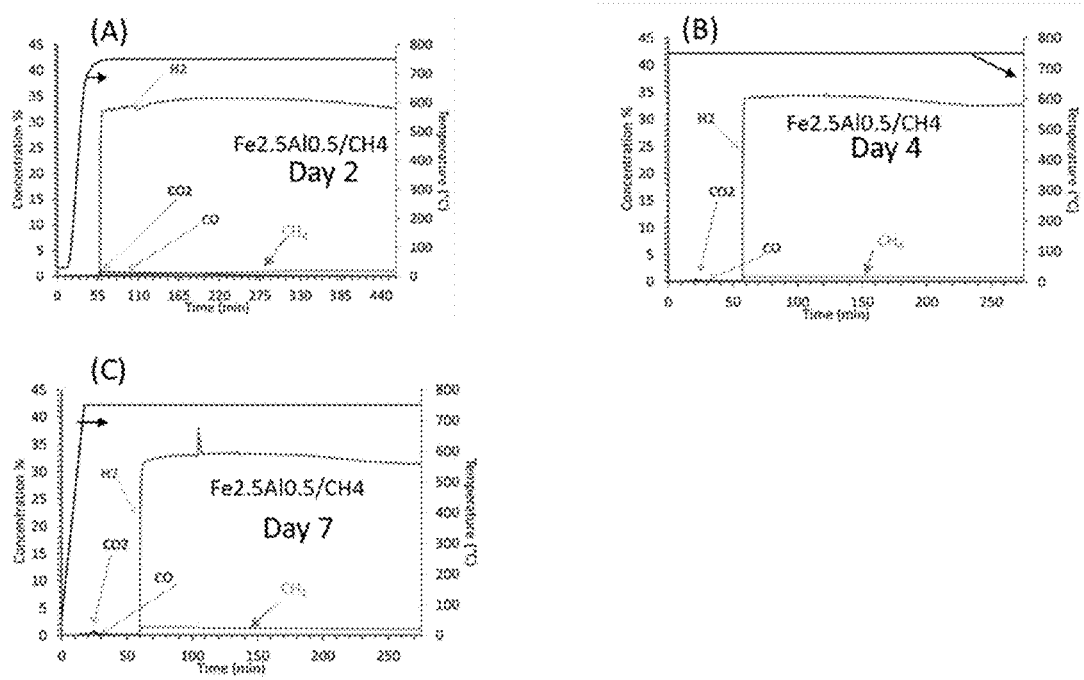
FIG. 5: depicts the effluent gas composition data during a 7-day methane test in a fixed bed flow reactor at 750° C. with $Fe_{2.5}$—$Al_{0.5}$—$O_z$ catalyst (A) Day 2 (B) Day 4 (C) Day 7.

The fixed bed flow reactor tests with $Fe_{2.5}$—$Al_{0.5}$—$O_z$ were conducted for 7 days. In the first day $Fe_{2.5}Al_{0.5}O_z$ calcined at 1200° C. was supplied to the reactor, reduced with 20% $H_2$ at 800° C., then methane (~16 vol. %) was delivered at 750° C. When the pressure of the reactor was above 70 psi, the catalytic reactor was cooled to ambient temperature and carbon (particles less than 75 microns) was withdrawn (removed). The catalyst (>75 microns) was recycled for continued methane reaction at 750° C. The tests were continued for 7 days with carbon removal and recycling the catalyst each day. The effluent gas concentration data for $2^{nd}$, $4^{th}$ and $7^{th}$ days during the 7-day test are shown in FIGS. 5A, 5B and 5C. Almost complete conversion of methane (>95%) to $H_2$ was observed with the catalyst and minimal amount (<1 vol. %) of methane was in the effluent gas stream. There was no CO or $CO_2$ in the effluent gas stream. The most difficult issue with the catalyst tests reported in literature with other catalysts has been the separation of carbon and maintaining the physical/chemical stability. However, with $Fe_x$—$Al_y$—$O_z$ calcined above 1150° C., the carbon separation was relatively easy and about 13 g of carbon was recovered after the 7-day test. The $H_2$ production rate remained stable even after 7-days of tests with carbon removal each day.

Figure 6:
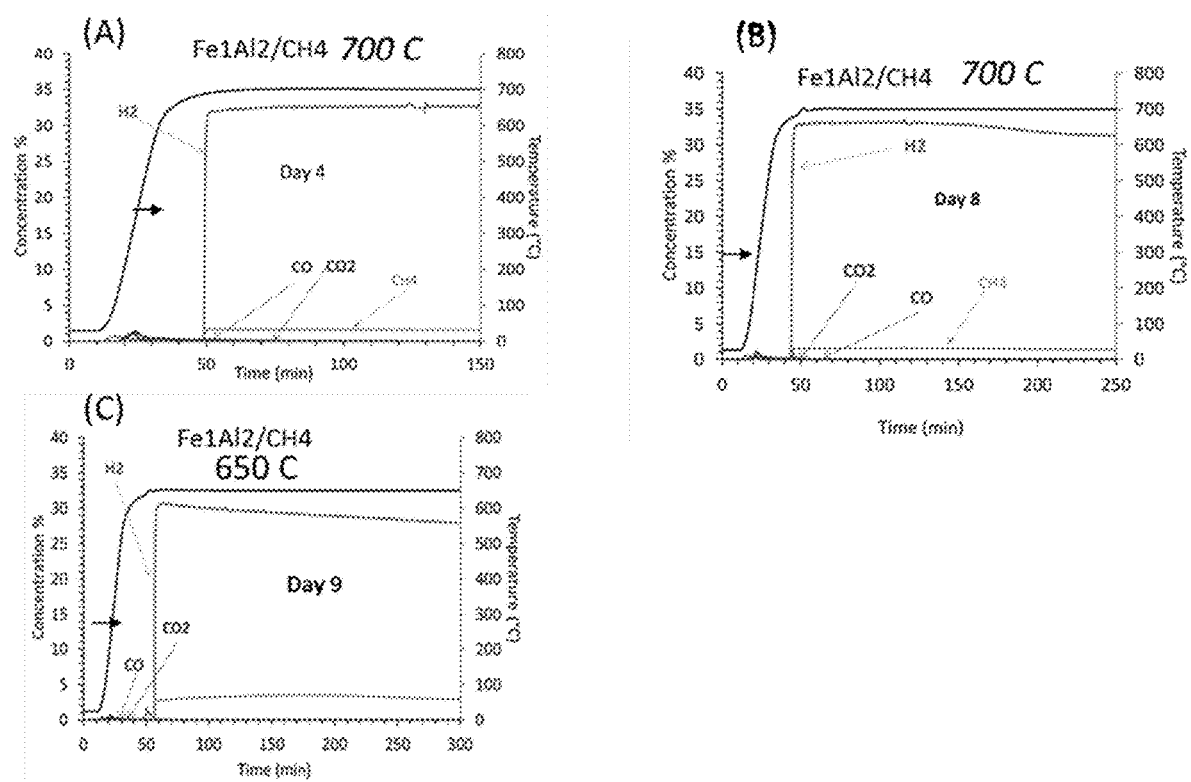
FIG. 6: depicts the effluent gas composition data from a methane test in a fixed bed flow reactor with $Fe$—$Al_2$—$O_z$ catalyst (A) Day 4 (B) Day 8 (C) Day 9.

The fixed bed flow reactor tests with Fe—$Al_2$—$O_z$ calcined at 1200° C. were conducted for 10 days. In the first day the catalyst supplied to the reactor was reduced with 20% $H_2$ at 800° C. and then methane (~16 vol. %) was delivered at 700° C. The tests were continued for 10 days with carbon removal and re-using the catalyst each day. The effluent gas concentration data where the reactor was maintained at 700° C. for 4th and 8th days during the 10-day test are shown in FIGS. 6A and 6B. At 700° C. high conversion of methane (90%) to $H_2$ was observed with the catalyst and minimal amount (<2 vol. %) of methane was in the effluent gas stream. During the $9^{th}$ day, the methane test was conducted at 650° C. and the data is shown in FIG. 6C. The methane conversion was still high (85%) at 650° C. but it was lower than that at 700° C.

Figure 7:
FIG. 7: depicts Scanning Electron photomicrographs (SEM) of carbon produced by methane decomposition with $Fe_{2.5}$—$Al_{0.5}$—$O_z$ catalyst at 750° C.
Figure 8:
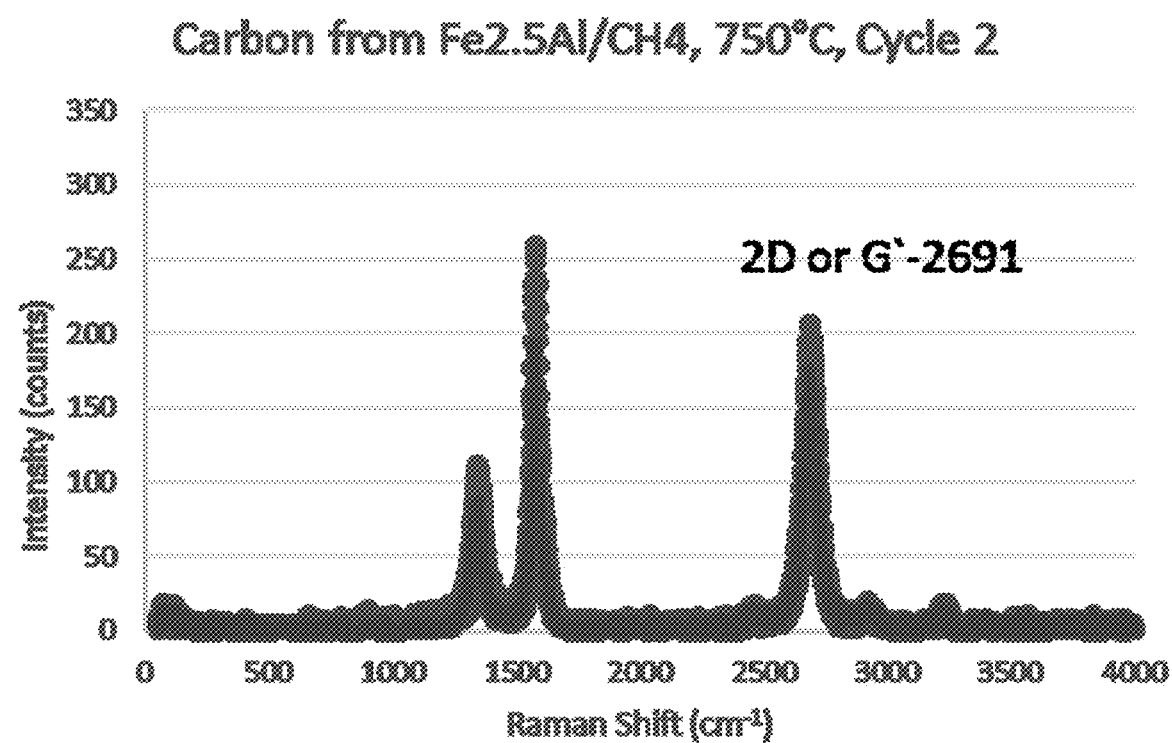
FIG. 8: depicts Raman spectra of carbon samples produced with $Fe_{2.5}$—$Al_{0.5}$—$O_z$ catalyst at 750° C.

The SEM photo micrographs of carbon obtained during the 7-day test with calcined $Fe_{2.5}$—$Al_{0.5}$—$O_z$ catalyst is shown in FIG. 7. Some carbon fibers were observed which indicted that valuable carbon is produced from the process. Raman spectra of carbon is shown in FIG. 8. The sharp and distinct bands at 1352 cm−1 (D band), 1579 cm−1 (G band) and 2691 cm−1 (G' band) indicated that valuable graphitic carbon and carbon fibers were formed.

Figure 9:
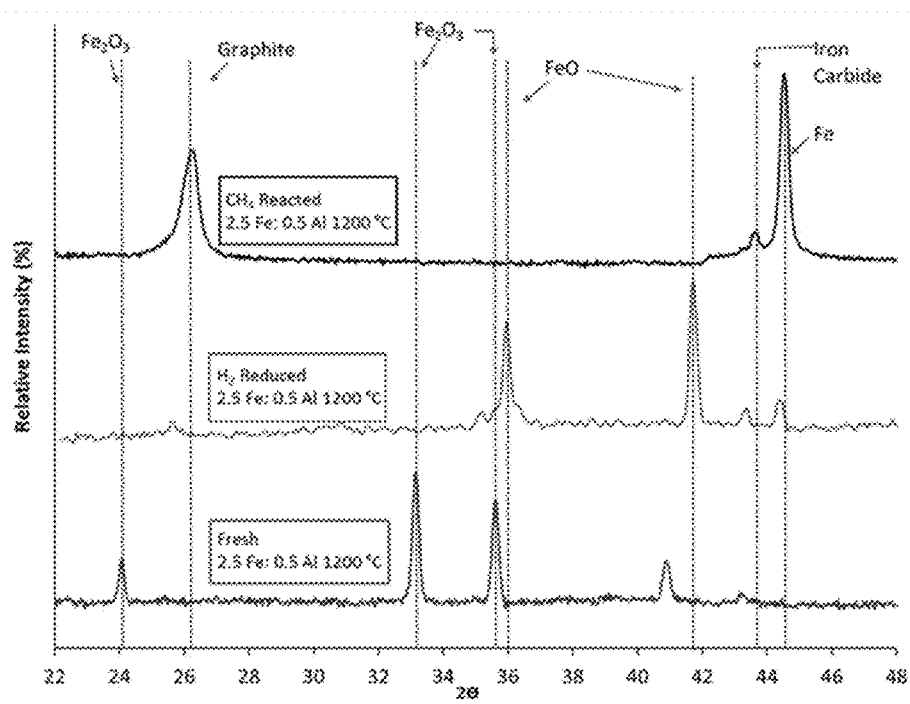
FIG. 9: depicts the X-Ray diffraction data of the fresh, reduced (with $H_2$ at 800° C.) and used (after methane reaction at 750° C.) $Fe_{2.5}$—$Al_{0.5}$—$O_z$ catalyst.

X-ray diffraction data of fresh, reduced and used calcined $Fe_{2.5}$—$Al_{0.5}$—$O_z$ catalyst are shown in FIG. 9. The fresh catalyst after calcination above 1150° C. contained mainly $Fe_2O_3$ and peaks corresponding to alumina were not visible which indicated a possible formation of solid solution between iron oxide and alumina (A peak corresponding to alumina was visible with catalyst calcined below 1150° C.). The catalyst was analyzed after reduction with $H_2$ at 800° C. XRD data showed the presence of FeO (main) and Fe phases. After the reaction with methane XRD data showed the presence graphitic carbon, $Fe^0$ and iron carbide.

Embodiments of the present invention provide one or more of the following: A calcined $Fe_{2.5}$—$Al_{0.5}$—$O_z$ catalyst prepared using iron oxide-alumina calcined above 1100° C. The catalyst demonstrated improved durability and reactivity over metal catalysts currently used in the decomposition of methane to produce carbon and hydrogen. The calcined $Fe_{2.5}$—$Al_{0.5}$—$O_z$ catalyst demonstrated high crush strength required for long term reaction stability after multiple steps involving carbon separations. The calcined $Fe_{2.5}$—$Al_{0.5}$—$O_z$ catalyst provided high conversion of methane (90-95%) to $H_2$ and carbon at 700-750° C. with no chemical degradation during long term tests. High quality graphene carbon was formed and separation of carbon easy. The calcined $Fe_{2.5}$—$Al_{0.5}$—$O_z$ catalyst was prepared using low cost environmentally safe materials and a low-cost preparation method which will contribute to a low-cost process.

Having described the basic concept of the embodiments, it will be apparent to those skilled in the art that the foregoing detailed disclosure is intended to be presented by way of example. Accordingly, these terms should be interpreted as indicating that insubstantial or inconsequential modifications or alterations and various improvements of the subject matter described and claimed are considered to be within the scope of the spirited embodiments as recited in the appended claims. Additionally, the recited order of the elements or sequences, or the use of numbers, letters or other designations therefor, is not intended to limit the claimed processes to any order except as may be specified. All ranges disclosed herein also encompass any and all possible sub-ranges and combinations of sub-ranges thereof. Any listed range is easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as up to, at least, greater than, less than, and the like refer to ranges which are subsequently broken down into sub-ranges as discussed above. As utilized herein, the terms "about," "substantially," and other similar terms are intended to have a broad meaning in conjunction with the common and accepted usage by those having ordinary skill in the art to which the subject matter of this disclosure pertains. As utilized herein, the term "approximately equal to" shall carry the meaning of being within 15, 10, 5, 4, 3, 2, or 1 percent of the subject measurement, item, unit, or concentration, with preference given to the percent variance. It should be understood by those of skill in the art who review this disclosure that these terms are intended to allow a description of certain features described and claimed without restricting the scope of these features to the exact numerical ranges provided. Accordingly, the embodiments are limited only by the following claims and equivalents thereto. All publications and patent documents cited in this application are incorporated by reference in their entirety for all purposes to the same extent as if each individual publication or patent document were so individually denoted.

The embodiment of the invention in which an exclusive property or privilege is claimed is defined as follows:

1. A method for decomposition of methane to hydrogen and carbon comprising:
   supplying to a catalytic reactor a calcined $Fe_x$—$Al_y$—$O_z$ catalyst, where the calcined $Fe_x$—$Al_y$—$O_z$ catalyst was calcined in air at a temperature above 1150° C., where the calcined $Fe_x$—$Al_y$—$O_z$ catalyst has a chemical composition of x>0.1, y>0.1, z≥0 and 0<x/y<200, and where the calcined $Fe_x$—$Al_y$—$O_z$ catalyst contains $Fe_2O_3$;
   delivering to the catalytic reactor a gaseous stream comprising a $C_1$ to $C_4$ hydrocarbon, a portion of the gaseous stream comprising methane;
   maintaining the catalytic reactor at a reducing temperature sufficient to decompose at least a portion of the $C_1$ to $C_4$ hydrocarbon to generate a gaseous product stream comprising $H_2$ and a solid product stream comprising carbon;
   withdrawing at least a portion of the gaseous product stream from the catalytic reactor; and,
   withdrawing at least a portion of the carbon from the catalytic reactor, wherein more than 80% of said methane is converted to $H_2$.

2. The method of claim 1 where gaseous stream is a continuous gas stream comprised of at least 5 vol. % $C_1$ to $C_4$ hydrocarbon.

3. The method of claim 1 where the reducing temperature is in a range from about 550° C. to about 1100° C.

4. The method in claim 1 further comprising reducing the calcined $Fe_x$—$Al_y$—$O_z$ catalyst with a reducing gas selected from the group comprising $H_2$, CO, or syngas.

5. The method of claim 1 where the calcined $Fe_x$—$Al_y$—$O_z$ catalyst has a molar composition of $Fe_{2.5}$—$Al_{0.5}$—$O_z$.

6. The method of claim 1 where the calcined $Fe_x$—$Al_y$—$O_z$ catalyst has a molar composition of Fe—$Al_2$—$O_z$.

7. The method of claim 1 where the calcined $Fe_x$—$Al_y$—$O_z$ catalyst has a molar composition of $Fe_{0.5}$—$Al_{2.5}$—$O_z$.

8. The method of claim 1 where the $C_1$ to $C_4$ hydrocarbon concentration of the gaseous stream is greater than 10 vol. %.

9. The method in claim 1 where the $C_1$ to $C_4$ hydrocarbon is selected from the group consisting of ethane, propane, butane, or ethylene.

10. The method in claim 1 where the calcined $Fe_x$—$Al_y$—$O_z$ catalyst was prepared from iron oxide and aluminum oxide.

11. The method of claim 1 further comprising separating at least a portion of the $H_2$ from the product gas stream.

12. The method in claim 1 further comprising removing at least a portion of the carbon from the solid product stream, where removing is performed by is by sieving, elutriation, or liquid separation.

13. A method for the decomposition of methane to hydrogen and carbon comprising:
   supplying to a catalytic reactor a calcined $Fe_x$—$Al_y$—$O_z$ catalyst, where the $Fe_x$—$Al_y$—$O_z$ catalyst was calcined in air at temperatures above 1150° C., and where the calcined $Fe_x$—$Al_y$—$O_z$ catalyst has a chemical composition of x>0.1, y>0.1, z≥0 and 0<x/y<200, where the calcined $Fe_x$—$Al_y$—$O_z$ catalyst was prepared from iron oxide and aluminum oxide, where the calcined $Fe_x$—$Al_y$—$O_z$ catalyst contains $Fe_2O_3$, and where the catalytic reactor contains at least two carbon outlet filters;
   delivering to the catalytic reactor a continuous gaseous stream comprising methane where methane concentration of the gaseous stream is greater than 5 vol. %;
   maintaining the catalytic reactor at a reducing temperature in a range from 550° C. to 1100° C. to decompose at least a portion of the methane to generate a gaseous product stream comprising $H_2$ and a solid product stream comprising carbon;
   maintaining a gaseous stream inlet flow rate sufficient to elutriate the carbon;
   directing an effluent gas flow from the catalytic reactor to a carbon outlet filter;
   alternating effluent gas flow between carbon outlet filters, and,
   withdrawing at least a portion of the gaseous product stream from the catalytic reactor, where the gaseous products comprise the product stream, and wherein more than 80% of said methane is converted to $H_2$.

14. A method for the decomposition of methane to hydrogen and carbon comprising:

supplying to a first catalytic reactor and a second catalytic reactor a calcined $Fe_x$—$Al_y$—$O_z$ catalyst, where the $Fe_x$—$Al_y$—$O_z$ catalyst was calcined in air at temperatures above 1150° C., and where the calcined $Fe_x$—$Al_y$—$O_z$ catalyst has a chemical composition of x>0.1, y>0.1, z≥0 and 0<x/y<200, where the calcined $Fe_x$—$Al_y$—$O_z$ catalyst was prepared from iron oxide and aluminum oxide, and where the calcined $Fe_x$—$Al_y$—$O_z$ catalyst contains $Fe_2O_3$;

delivering to the first catalytic reactor a continuous gaseous stream comprising methane, where methane concentration of the gaseous stream is greater than 5 vol. %, wherein the first catalytic reactor is at a first pressure when delivery of the continuous gaseous stream of methane begins;

maintaining the catalytic reactor at a reducing temperature in a range from about 550° C. to about 1100° C. to decompose at least a portion of the methane to generate a gaseous product stream comprising $H_2$ and a solid product stream comprising carbon;

withdrawing at least a portion of the gaseous product stream from the catalytic reactor, where the gaseous products comprise the product stream;

monitoring pressure of the first reactor;

directing the continuous gaseous stream to the second catalytic reactor when the pressure of the first reactor increases above the first pressure;

withdrawing at least a portion of the solid product stream from the first catalytic reactor; and, alternating the continuous gaseous stream and the withdrawing at least a portion of the solid product stream between the first catalytic reactor and the second catalytic reactor, wherein more than 80% of said methane is converted to $H_2$.

15. The method in claim 9 further comprising recycling the calcined $Fe_x$—$Al_y$—$O_z$ catalyst.

* * * * *